US009960658B2

United States Patent
Wiese (10) Patent No.: US 9,960,658 B2
(45) Date of Patent: May 1, 2018

(54) CLOSURE APPARATUS FOR A HOUSING FOR DAMPING INTERFERENCE SIGNALS OF A COMMUTATED ELECTRIC MOTOR

(75) Inventor: Peter Wiese, Kelkheim (DE)

(73) Assignee: Continental Automotive GmbH, Hannover (DE)

(*) Notice: Subject to any disclaimer, the term of this patent is extended or adjusted under 35 U.S.C. 154(b) by 1078 days.

(21) Appl. No.: 14/344,270

(22) PCT Filed: Sep. 10, 2012

(86) PCT No.: PCT/EP2012/067640
§ 371 (c)(1),
(2), (4) Date: Mar. 11, 2014

(87) PCT Pub. No.: WO2013/037728
PCT Pub. Date: Mar. 21, 2013

(65) Prior Publication Data
US 2014/0265684 A1    Sep. 18, 2014

(30) Foreign Application Priority Data
Sep. 12, 2011   (DE) .......................... 10 2011 082 542

(51) Int. Cl.
*H02K 11/00*    (2016.01)
*H02K 11/026*   (2016.01)
(Continued)

(52) U.S. Cl.
CPC .......... *H02K 11/0005* (2013.01); *F02D 11/10* (2013.01); *H02K 11/01* (2016.01);
(Continued)

(58) Field of Classification Search
CPC .. H02K 5/10; H02K 5/24; H02K 7/14; H02K 11/00; H02K 11/0005; H02K 11/01;
(Continued)

(56) References Cited

U.S. PATENT DOCUMENTS 5,656,878 A    8/1997  Nakata
8,901,792 B2 * 12/2014 Mizutani ................ H02K 5/148
                                                                310/239
(Continued)

FOREIGN PATENT DOCUMENTS

GB        2 256 532 A    12/1992

*Primary Examiner* — Bernard Rojas
*Assistant Examiner* — Rashad Johnson
(74) *Attorney, Agent, or Firm* — Cozen O'Connor (57) ABSTRACT

A mechanically commutated electric motor is at least partially arranged in a closure apparatus for a housing. The closure apparatus includes at least a first rod-like throttle coil and a second rod-like throttle coil which are wound in opposite directions with coil wire and which are arranged parallel to one another. The first throttle coil is electrically directly coupled to a first coupling element provided for electrical coupling to the mechanically commutated electric motor, and the second throttle coil is electrically directly coupled to a second coupling element provided for electrical coupling to the mechanically commutated electric motor, such that, when the mechanically commutated electric motor is connected to the coupling elements and the mechanically commutated electric motor is operated, the magnetic fluxes (Phi1, Phi2) in the first throttle coil and second throttle coil at least partially compensate one another.

4 Claims, 5 Drawing Sheets

(51) Int. Cl.
  *H02K 11/02* (2016.01)
  *F02D 11/10* (2006.01)
  *H02K 11/01* (2016.01)
  H02K 5/10 (2006.01)
  H02K 7/14 (2006.01)

(52) U.S. Cl.
  CPC ......... *H02K 11/024* (2013.01); *H02K 11/026* (2013.01); *H02K 5/10* (2013.01); *H02K 7/14* (2013.01)

(58) Field of Classification Search
  CPC .... H02K 11/02; H02K 11/024; H02K 11/026; H02K 13/02; F02D 11/10; H01R 39/14
  USPC ..................................... 310/71, 89, 219–253
  See application file for complete search history.

(56) References Cited

U.S. PATENT DOCUMENTS

| | | | | |
|---|---|---|---|---|
| 9,145,855 | B2* | 9/2015 | Lindner | H02K 11/026 |
| 2002/0163263 | A1* | 11/2002 | Uffelman | F04B 17/03 |
| | | | | 310/71 |
| 2002/0163279 | A1* | 11/2002 | Mueller | H02K 5/143 |
| | | | | 310/239 |
| 2004/0046480 | A1* | 3/2004 | Takahashi | H02K 5/148 |
| | | | | 310/239 |
| 2004/0056540 | A1* | 3/2004 | Kraenzler | H02K 11/024 |
| | | | | 310/51 |
| 2004/0195927 | A1* | 10/2004 | Naman | H02K 11/026 |
| | | | | 310/239 |
| 2005/0264127 | A1* | 12/2005 | Benkert | H02K 5/148 |
| | | | | 310/239 |
| 2015/0091401 | A1* | 4/2015 | Buerger | H02K 5/225 |
| | | | | 310/71 |

\* cited by examiner

CLOSURE APPARATUS FOR A HOUSING FOR DAMPING INTERFERENCE SIGNALS OF A COMMUTATED ELECTRIC MOTOR

CROSS-REFERENCE TO RELATED APPLICATIONS

This is a U.S. national stage of application No. PCT/EP2012/067640, filed on 10 Sep. 2012, which claims priority to the German Application No. 10 2011 082 542.8, filed 12 Sep. 2011, the content of both incorporated herein by reference.

BACKGROUND OF THE INVENTION

1. Field of the Invention

The invention relates to a closure apparatus for a housing, in which a mechanically commutated electric motor is arranged at least partially, and to a servo drive which has this closure apparatus.

2. Related Art

Owing to very stringent requirements in respect of electromagnetic compatibility (EMC requirements), mechanically commutated electric motors nowadays need to have interference suppression, which is complex. This applies in particular to mechanically commutated electric motors used in motor vehicles. In the case of mechanically commutated electric motors, as a result of the constant interruption to the current flow on further-rotation of an armature, electromagnetic interference occurs, which is emitted by the electric motor to the surrounding environment. For interference suppression of the mechanically commutated electric motors, so-called rod core inductors are usually used, which can be produced inexpensively. This type of inductor damps both common-mode and normal-mode interference that can develop in the mechanically commutated electric motor. Common-mode interference is understood here to mean interference currents that flow in the same direction on all supply lines of the mechanically commutated electric motor. Normal-mode interference is understood here to mean electric currents that occur as currents flowing in both directions in the lines of the mechanically commutated electric motor. In the case of mechanically commutated electric motors, currents with very different current intensities can occur. Thus, in the case of mechanically commutated electric motors, extremely high blocking currents can occur with a current intensity, which is a multiple greater than a no-load current intensity. The blocking current characterizes a maximum current drawn by the electric motor when the rated voltage is applied if the axis of the electric motor is blocked. In many control engineering applications, the mechanically commutated electric motor is in one position for a large portion of its use time and in the process only draws a small current. Only in the case of rapid changes in position do brief current peaks in the incoming and outgoing lines of the mechanically commutated electric motor occur, wherein these current peaks can have current intensities that are higher by a factor of 10 than a mean current of the electric motor. Precisely in operating states in which these current peaks occur, electromagnetic interference results.

In order to suppress the electromagnetic interference, rod inductors can be used, which have an inductor coil core and an inductor coil wire wound around that inductor coil core. In general, the inductor coil core comprises or consists substantially of a soft-magnetic ferrite, whose relative permeability $\mu_r$ is substantially greater than 1. Typically, the relative permeability $\mu_r$ is approximately 250 in order to increase the inductance and therefore the damping, wherein the inductance increases nonlinearly with the permeability. The cause of the nonlinear relationship between the relative permeability and the inductance lies in the principle of shearing. If the inductor coil core is caused to enter saturation owing to high current peaks, the permeability of the inductor coil core can collapse and return to a value of approximately 1. This can result in a drastic dip in the damping properties and therefore a severely reduced interference suppression effect of the inductor coil. For this reason, the inductor coil core is selected to be as large as possible, depending on the amount of physical space available. In addition, the inductor coils are arranged removed from one another in such a way that they have no or virtually no magnetic coupling. In the case of additive superimposition of the magnetic fields of inductor coils, an inductor coil core can enter saturation already at very low currents, as a result of which a desired interference suppression effect of the inductor coils may be absent.

SUMMARY OF THE INVENTION

An object of the invention includes providing a closure apparatus for a housing, in which a mechanically commutated electric motor is arranged at least partially, which closure apparatus makes a contribution to damping interference signals produced by the mechanically commutated electric motor to a sufficient extent. In addition, an object of the invention consists in providing a servo drive that makes a contribution to keeping interference signals output by the servo drive as low as possible.

In accordance with a first aspect, a closure apparatus for a housing is provided, in which a mechanically commutated electric motor is arranged at least partially. The closure apparatus comprises at least a first rod-shaped inductor coil and a second rod-shaped inductor coil, around which coil wire is wound with the opposite winding sense and which are arranged parallel to one another. The first inductor coil is coupled electrically directly to a first coupling element, which is provided for an electrical coupling to the mechanically commutated electric motor, and the second inductor coil is coupled electrically directly to a second coupling element, which is provided for an electrical coupling to the mechanically commutated electric motor, with the result that on connection of the mechanically commutated electric motor to the coupling elements and during operation of the mechanically commutated electric motor, the magnetic fluxes in the first and second inductor coils are at least partially compensated for.

By virtue of such mirror-symmetrical arrangement, the magnetic fluxes in the two inductor coils compensate for one another at least partially and the two inductor coils do not enter saturation even in the case of high energization, with the result that their interference suppression effect is maintained continuously. Advantageously, the dimensions of the inductor coil cores of the two inductor coils can thus be kept small, as a result of which installation space can be saved and the two inductor coils can be arranged in a tight space in a compact manner. This has the further advantage that current-conducting connecting lines between the mechanically commutated electric motor and the two inductor coils can be kept very short, and therefore the connecting lines do not act as antennas that emit interference signals, or only do so to a very small extent. In addition, the compact arrangement of the two inductor coils has the advantage that the current-conducting connecting lines between the mechanically commutated electric motor and the two inductor coils can be routed tightly adjacent to one another. An area that encloses the connecting lines can therefore be kept very small and emission of interference signals can be minimized.

The arrangement of the first and second inductor coils in the closure apparatus has the advantage that the electric motor does not need to have the interference suppression discussed above. Dimensioning and arrangement of the two inductor coils can be performed independently of the space conditions of the electric motor.

According to one aspect, in an advantageous configuration, the closure apparatus has a base, and the first inductor coil and the second inductor coil are arranged along their mid-axes parallel to the base on and/or at least partially in the base. This enables a simple, space-saving and/or mechanically stable arrangement of the first and second inductor coils.

According to another aspect, in a further advantageous configuration, the first inductor coil and the second inductor coil are arranged on an inner side of the base, the inner side facing the electric motor. This makes it possible to protect the two inductor coils from environmental influences, for example dirt and/or moisture.

According to another aspect, in a further advantageous configuration, the first inductor coil and the second inductor coil have an at least approximately identical inductor coil diameter, and the ratio of a distance between the respective mid-axis of the first inductor coil and the second inductor coil to the inductor coil diameter is greater than 1 and less than 1.8. In an arrangement of the two inductor coils in which the ratio of the distance to the inductor coil diameter is greater than 1 and less than 3, the magnetic fluxes in the inductor coils at least partially compensate for one another. For improved interference suppression, however, it is advantageous to select the distance to be not too great. It is more advantageous, therefore, to select a ratio which is between 1 and 1.8.

In another aspect, in a further advantageous configuration, the ratio of the distance between the respective mid-axis of the first inductor coil and the second inductor coil to the inductor coil diameter is greater than 1 and less than 1.5. In this configuration, the magnetic fluxes of the two inductor coils are superimposed on one another such that their normal-mode fluxes generated by the operating current of the electric motor compensate for one another approximately by half. The inductance for normal-mode currents is consequently also reduced to approximately half the value of a single inductor. At the same time, the common-mode fluxes produced by superimposed common-mode currents are doubled. The common-mode inductance is therefore doubled. This configuration is therefore particularly advantageous if, depending on the operating mode, high peak currents can occur and/or particularly stringent requirements are set for the damping of the common-mode interference.

In another aspect, in a further advantageous configuration, the ratio of the distance between the respective mid-axis of the first inductor coil and the second inductor coil to the inductor coil diameter is greater than 1 and less than 1.3. In this configuration, the magnetic fluxes of the two inductor coils are superimposed on one another such that their normal-mode fluxes produced by the operating current of the electric motor are compensated for approximately by half. In comparison with an otherwise identical arrangement, but in the case of winding of the two inductor coils with the same winding sense, the normal-mode fluxes compensate for one another approximately to one quarter. The inductance for normal-mode currents is consequently also reduced to approximately half the value of a single inductor or approximately a quarter of the value in the case of winding with the same winding sense. At the same time, the magnetic common-mode fluxes which are produced by the superimposed common-mode currents are doubled approximately by the superimposition, as a result of which the common-mode inductance is also doubled. This area of the design is therefore particularly advantageous if, depending on the operating mode, high peak currents can occur and/or particularly stringent requirements are placed on the damping of the common-mode interference.

In another aspect, in a further advantageous configuration, the ratio of the distance between the respective mid-axis of the first inductor coil and the second inductor coil to the inductor coil diameter is greater than 1.5 and less than 1.8. In this area of the design, the magnetic fluxes of the two inductor coils are superimposed on one another such that their normal-mode fluxes produced by the operating current of the electric motor compensate for one another approximately to one quarter or, based on an otherwise identical arrangement, but in the case of winding of the two inductor coils with the same winding sense, to approximately half. The inductance for normal-mode fluxes is consequently also reduced to approximately three quarters of the value of a single inductor or approximately half the value in the case of winding with the same winding sense. At the same time, as a result of the superimposition, the magnetic common-mode fluxes which are produced by the common-mode currents are increased, as a result of which the common-mode inductance is also increased by a third, in relation to a single inductor, or to approximately one and a half times the value in the case of winding with the same winding sense. This area of the design is therefore particularly advantageous if the peak currents to be expected are lower, in any case below ⁴⁄₃ (four thirds) of the saturation current of a single inductor and/or if a balanced damping response is required for normal-mode and common-mode interference.

In another aspect, in a further advantageous configuration, the closure apparatus comprises a plastic or consists of the plastic. This enables an inexpensive production of the closure apparatus.

In accordance with a second aspect, a servo drive is provided, which has a mechanically commutated electric motor, a housing with an opening and a closure apparatus in accordance with the first aspect. The mechanically commutated electric motor is arranged at least partially in the housing, and the closure apparatus is coupled mechanically to the housing such that it closes the opening of the housing. The mechanically commutated electric motor is coupled electrically to the coupling elements. Advantageous configurations of the first aspect apply here too to the second aspect.

BRIEF DESCRIPTION OF THE DRAWINGS

Exemplary embodiments of the invention will be explained below with reference to the schematic drawings, in which.

DETAILED DESCRIPTION OF THE PRESENTLY PREFERRED EMBODIMENTS

Figure 1:
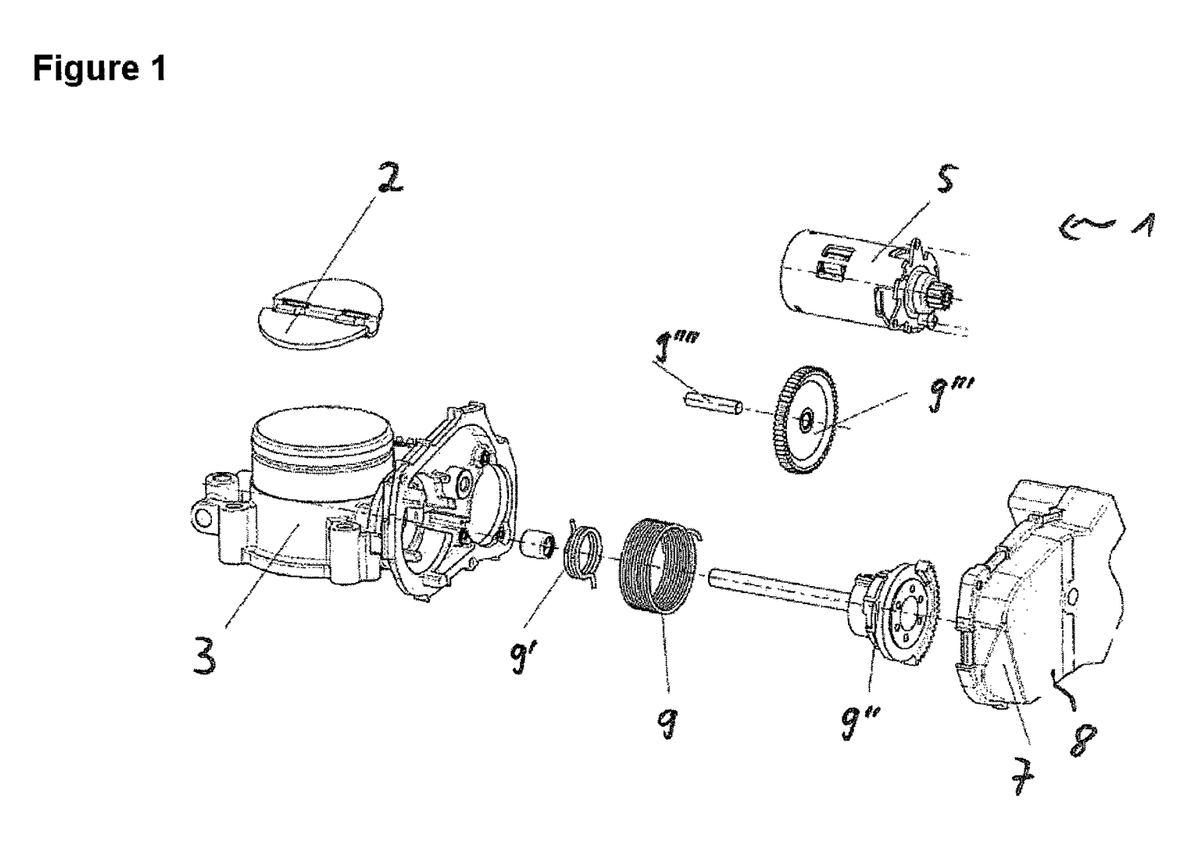
FIG. 1 shows an exemplary embodiment of a servo drive in a schematic exploded illustration.

FIG. 1 shows an exemplary embodiment of a servo drive 1 in a schematic exploded illustration. The servo drive 1 has a mechanically commutated electric motor 5. The servo drive 1 is designed to actuate a load 2, for example. The servo drive 1 can be arranged in a motor vehicle. The servo drive 1 can be used, for example, as a throttle valve servo drive 1 of an internal combustion engine, and the load 2 can comprise a throttle valve.

The servo drive 1 also has a housing 3. The mechanically commutated electric motor 5 is arranged at least partially in the housing 3. Furthermore, the servo drive 1 can have, for example, a transmission comprising a plurality of transmission components 9 . . . 9''''. The transmission can likewise be arranged in the housing 3. The housing 3 has an opening, via which the various elements of the servo drive 1 can be introduced into the housing 3 during fitting of the servo drive 1. Once the fitting process is complete, this opening is preferably closed in order to protect the components of the servo drive 1 from environmental influences, for example dirt and/or moisture. For this, the servo drive 1 preferably has a closure apparatus 7.

Figure 2:
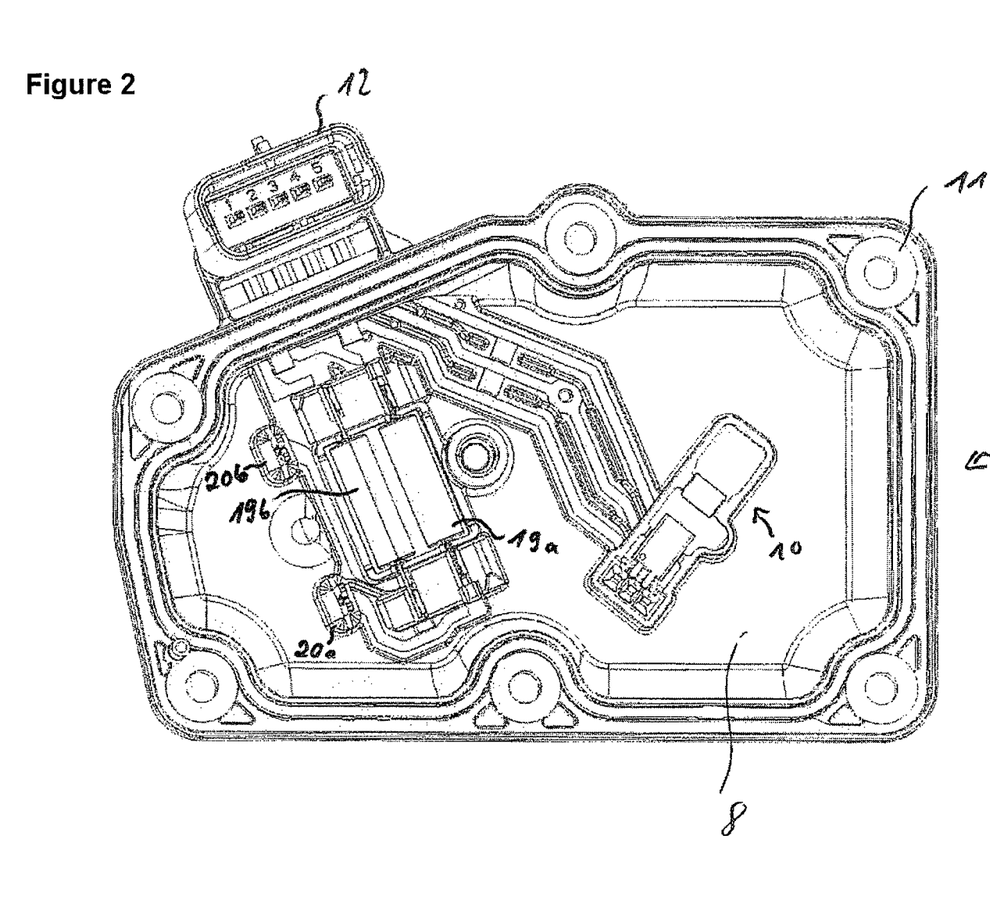
FIG. 2 shows an exemplary detail illustration of a closure apparatus.

FIG. 2 shows, by way of example, a detailed illustration of the closure apparatus 7. The closure apparatus 7 can furthermore have one or more sensor elements 10 and/or further connecting elements 11 and/or plug-type connector elements 12. The closure apparatus 7 comprises at least a first rod-shaped inductor coil 19a and a second rod-shaped inductor coil 19b, around which coil wire is wound with opposite winding senses, and which are arranged parallel to one another. The first inductor coil 19a is coupled electrically directly to a first coupling element 20a, which is provided for an electric coupling to the mechanically commutated electric motor 5, and the second inductor coil 19b is coupled electrically directly to a second coupling element 20b, which is provided for an electrical coupling to the mechanically commutated electric motor 5, with the result that, on connection of the mechanically commutated electric motor 5 to the coupling elements 20a, 20b and during operation of the mechanically commutated electric motor 5, the magnetic fluxes Φ1, Φ2 in the first inductor coil 19a and the second inductor coil 19b at least partially compensate for one another.

Figure 3:
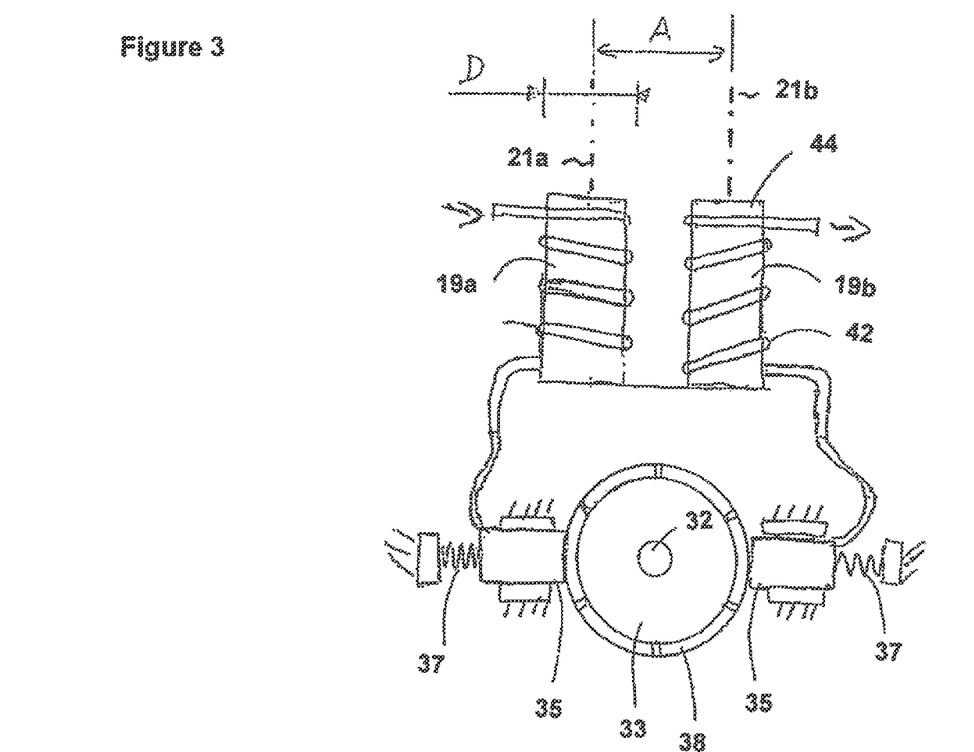
FIG. 3 shows a cross-sectional view of an electric motor.

As can be seen, for example, in FIG. 3, the closure apparatus 7 has a base, and the first inductor coil 19a and the second inductor coil 19b are arranged along their mid-axes 21a, 21b parallel to the base on an inner side of the base, the inner side facing the electric motor 5.

The two inductor coils 19a, 19b can therefore be arranged in a tight space in a compact manner. This has the advantage that current-conducting connecting lines between the mechanically commutated electric motor 5 and the two inductor coils 19a, 19b can be kept very short, such that the connecting lines do not act as antennas that emit interference signals, or only do so to a very small extent. The length of the connecting lines, for example, between motor connection lugs and the first inductor coil 19a or the second inductor coil 19b, i.e., the region which has not yet been filtered by the two inductor coils 19a, 19b, can have a length of less than 25 mm, for example. In addition, the compact arrangement of the two inductor coils 19a, 19b has the advantage that the current-conducting connecting lines between the mechanically commutated electric motor 5 and the two inductor coils 19a, 19b can be routed tightly adjacent to one another, for example at a distance of approximately 3 mm. An area that encloses the connecting lines can therefore be kept very small. The area can be less than 350 mm$^2$, for example. This advantageously makes it possible for a sufficient emission response to be achievable, at least below 1 GHz.

FIG. 3 shows a cross-sectional view of the mechanically commutated electric motor 5 perpendicular to a motor shaft 32 of the electric motor 5. The electric motor 5 has an armature 33. The armature 33 is mounted rotatably with the rotor shaft 32. For example, magnet coils having armature windings are formed on the armature 33. Furthermore, the electric motor 5 has brushes 35, which transfer a drive current for the mechanically commutated electric motor 5 to the armature windings. These brushes 35 are pressed by contact-pressure springs 37 against a mechanical commutation unit 38 for the electric current, which mechanical commutation unit is only illustrated schematically here. The drive currents for the mechanically commutated electric motor 5 are transferred to the commutation unit 38 via the brushes 35. In addition, FIG. 3 shows, schematically, an arrangement of the first inductor coil 19a and second inductor coil 19b in the closure apparatus 7. The figure shows the winding of the inductor coil cores 44 with the inductor coil wire 42 with opposite winding senses. The first inductor coil 19a and the second inductor coil 19b have, for example, an at least approximately identical inductor coil diameter D. The ratio of a distance A between the respective mid-axis 21a, 21b of the first inductor coil 19a and the second inductor coil 19b to the inductor coil diameter D is greater than 1 and less than 1.8, for example. By virtue of the fact that the inductor coils 19a, 19b are arranged close next to one another and are wound with coil wire with opposite winding senses, the magnetic fluxes Φ1, Φ2 in the two inductor coils 19a, 19b at least partially compensate for one another.

Figure 4:
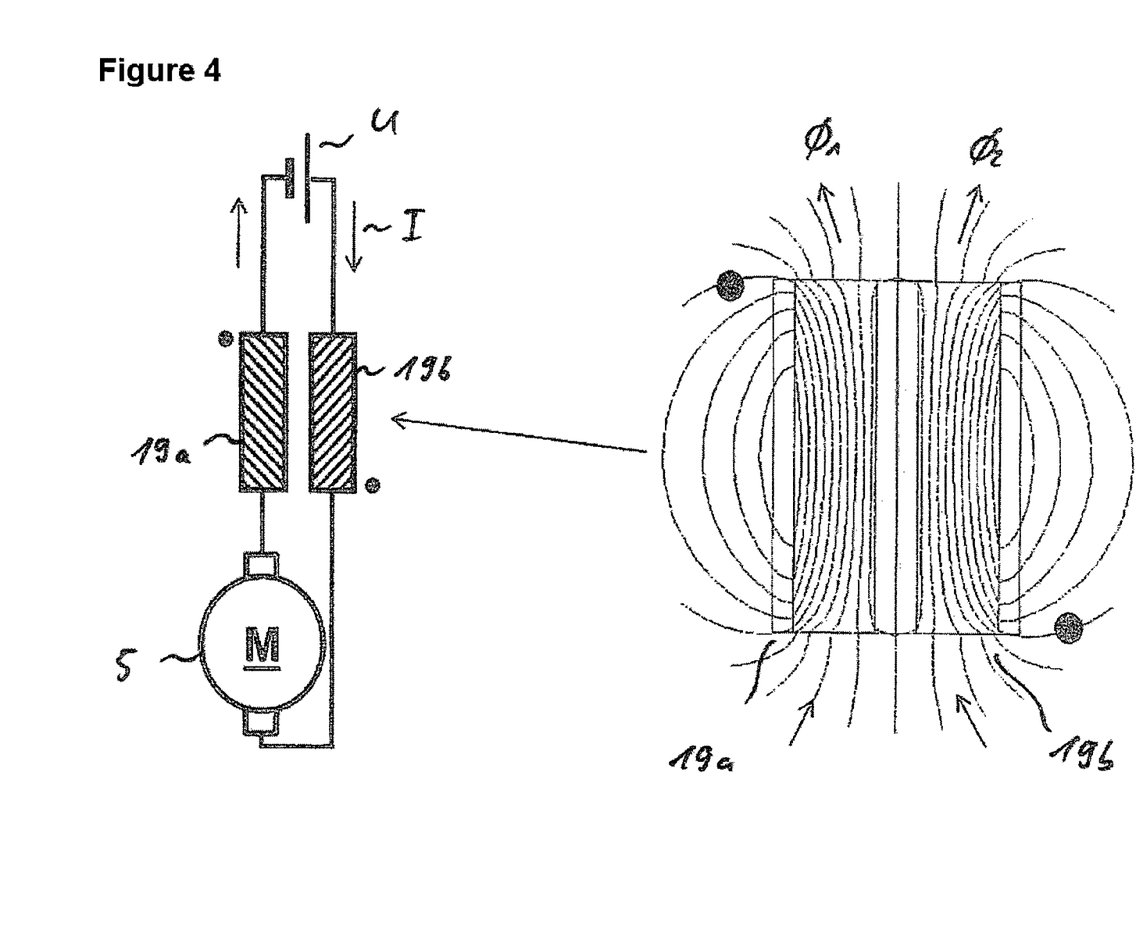
FIG. 4 shows a schematic illustration of the normal-mode response of a first inductor coil and second inductor coil of the closure apparatus.

FIG. 4 shows the mechanically commutated electric motor 5, which is connected to a DC voltage source via the two rod-shaped inductor coils 19a, 19b and motor connections. The normal-mode response of the first inductor coil 19a and the second inductor coil 19b is illustrated below with reference to FIG. 4. A direct current, which is required for torque generation of the electric motor 5, and some of a superimposed alternating current flow into one motor connection and out of the other. This is therefore referred to as normal-mode currents. Owing to the mirror-image windings, fluxes Φ1, Φ2 in the same direction result in the first inductor coil 19a and the second inductor coil 19b. The lines of force repel one another, and the inductance and the magnetic saturation degree of the inductor coil core 44 are reduced for the normal-mode currents. The inductor coil core 44 only enters saturation at currents with relatively high current intensities.

If the ratio between the distance A and the inductor coil diameter D is greater than 1 and less than 1.5, the magnetic fluxes Φ1, Φ2 of the two inductor coils 19a, 19b are superimposed on one another such that their normal-mode fluxes produced by the normal-mode current of the electric motor 5 approximately compensate for one another to half. The inductance for normal-mode currents is consequently also reduced to approximately half the value of a single inductor. If the ratio between the distance A and the inductor coil diameter D is greater than 1 and less than 1.3, the magnetic fluxes Φ1, Φ2 of the two inductor coils 19a, 19b are superimposed on one another such that their normal-mode fluxes produced by the normal-mode current of the electric motor 5 compensate for one another approximately to half. In comparison with an otherwise identical arrangement, but in the case of winding of the two inductor coils with the same winding sense, the normal-mode fluxes compensate for one another approximately to one quarter. The inductance for normal-mode currents is consequently also reduced to approximately half the value of a single inductor or approximately one quarter of the value in the case of winding with the same winding sense. If the ratio between the distance A and the inductor coil diameter D is greater than 1.5 and less than 1.8, the magnetic fluxes Φ1, Φ2 of the two inductor coils 19a, 19b are superimposed on one another in such a way that their normal-mode fluxes produced by the normal-mode current of the electric motor 5 compensate for one another approximately to one quarter or, based on an otherwise identical arrangement, but in the case of winding of the two inductor coils with the same winding sense, to approximately half. The inductance for normal-mode fluxes is consequently also reduced to approximately three quarters of the value of a single inductor or approximately half the value in the case of winding with the same winding sense.

Figure 5:
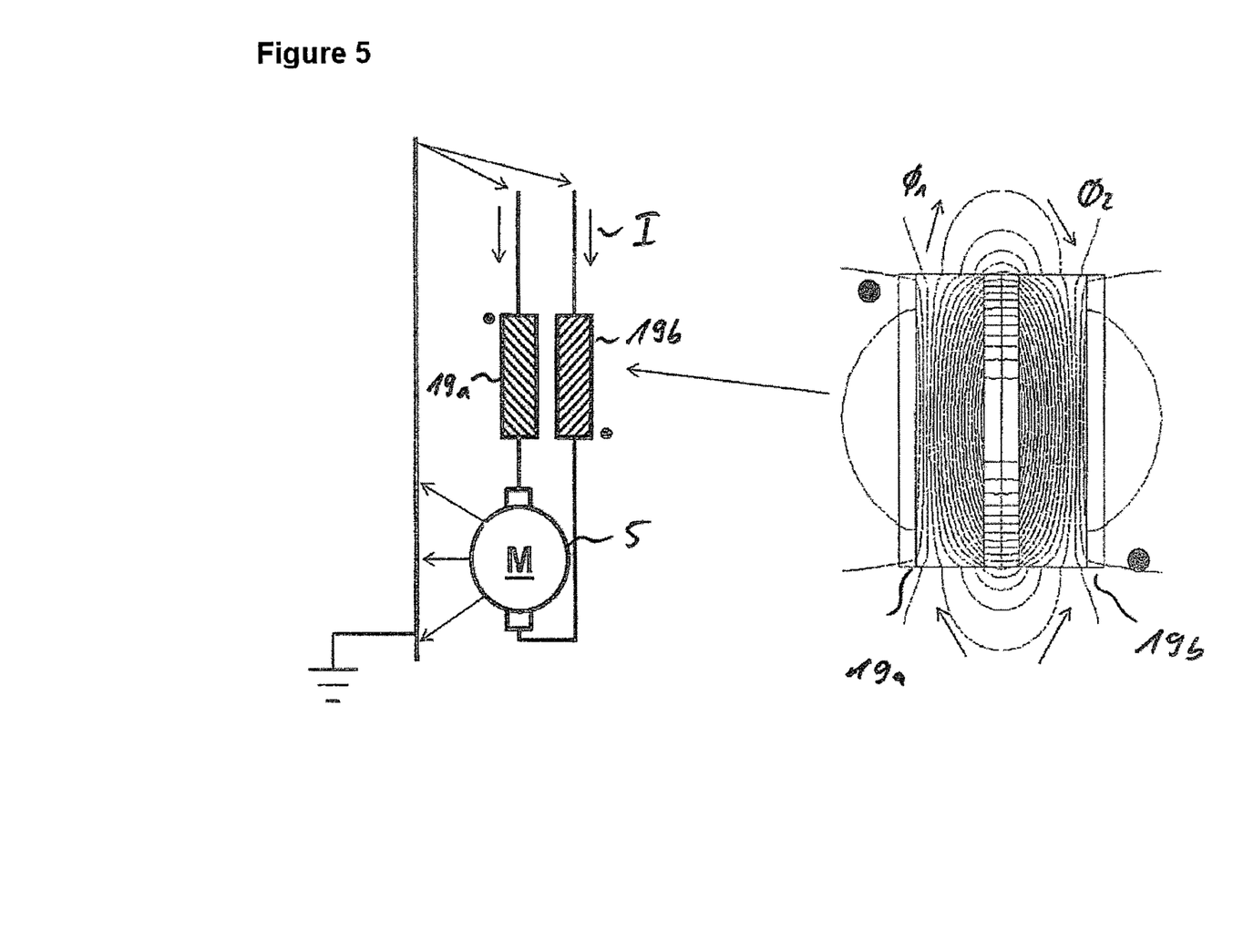
FIG. 5 shows a schematic illustration of the common-mode response of the first inductor coil and the inductor coil of the closure apparatus.

The common-mode response of the first inductor coil 19a and the second inductor coil 19b will be explained below with reference to FIG. 5. FIG. 5 shows an electric motor 5 coupled to a supply source via the two inductor coils 19a, 19b. So-called common-mode currents flow in the same direction in both motor connections. The circuit is closed via connections to ground and/or parasitic capacitances. Owing to the mirror-image windings, fluxes Φ1, Φ2 in the opposite direction result in the two inductor coils 19a, 19b. The lines of force attract one another, and the inductance of the common-mode currents is increased. The magnetic saturation degree of the inductor core remains uncritical since the common-mode currents are low in comparison with the DC operating current of the electric motor 5.

If the ratio between the distance A and the inductor coil diameter D is greater than 1 and less than 1.5, the magnetic fluxes Φ1, Φ2 of the two inductor coils 19a, 19b are superimposed on one another such that the common-mode fluxes produced by superimposed common-mode currents and therefore the common-mode inductance are doubled. If the ratio between the distance A and the inductor coil diameter D is greater than 1.5 and less than 1.8, the magnetic common-mode fluxes which are produced by the common-mode currents are increased as a result of the superimposition, as a result of which the common-mode inductance is increased by a third, in relation to a single inductor, or to approximately one and a half times the value in the case of winding with the same winding sense.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A closure apparatus (7) for a housing (3), in which a mechanically commutated electric motor (5) is at least partially arranged, the closure apparatus (7) comprising:
   a first rod-shaped inductor coil (19a) having a mid-axis (21a);
   a second rod-shaped inductor coil (19b), having a mid-axis (21b), around which coil wire is wound with a winding sense opposite the winding sense of the first rod-shaped inductor coil (19a), the first rod-shaped inductor coil (19a) and the second rod-shaped inductor coil (19b) being arranged parallel to one another in the closure apparatus (7); and
   a base (8) in which the first inductor coil (19a) and the second inductor coil (19b) are arranged along their mid-axes (21a, 21b) parallel to the base (8) on and/or at least partially in the base,
   wherein:
      the first inductor coil (19a) is coupled electrically directly to a first coupling element (20a) electrically coupled to the mechanically commutated electric motor (5), and the second inductor coil (19b) is coupled electrically directly to a second coupling element (20b) electrically coupled to the mechanically commutated electric motor (5), such that upon connection of the mechanically commutated electric motor (5) to the first and second coupling elements (20a, 20b) and during operation of the mechanically commutated electric motor (5), the magnetic fluxes (Φ1, (Φ2) in the first and second inductor coils (19a, 19b) at least partially compensate for one another, and
   the first inductor coil (19a) and the second inductor coil (19b) have an at least approximately identical inductor coil diameter (D), and the ratio of a distance (A) between the respective mid-axes (21a, 21b) of the first inductor coil (19a) and the second inductor coil (19b) to the inductor coil diameter (D) is greater than 1 and less than 1.8.

2. The closure apparatus (7) as claimed in claim 1,
   wherein the ratio of the distance (A) between the respective mid-axes (21a, 21b) of the
   first inductor coil (19a) and the second inductor coil (19b) to the inductor coil diameter (D) is greater than 1 and less than 1.5.

3. The closure apparatus (7) as claimed in claim 2,
   wherein the ratio of the distance (A) between the respective mid-axes (21a, 21b) of the first inductor coil (19a) and the second inductor coil (19b) to the inductor coil diameter (D) is greater than 1 and less than 1.3.

4. The closure apparatus (7) as claimed in claim 1,
   wherein the ratio of the distance (A) between the respective mid-axes (21a, 21b) of the first inductor coil (19a) and the second inductor coil (19b) to the inductor coil diameter (D) is greater than 1.5 and less than 1.8.

* * * * *